(12) United States Patent
Tan et al.

(10) Patent No.: US 11,120,933 B1
(45) Date of Patent: Sep. 14, 2021

(54) STACK CAP WITH A NON-MAGNETIC LAYER INCLUDING FERROMAGNETIC ELEMENTS

(71) Applicant: Seagate Technology LLC, Cupertino, CA (US)

(72) Inventors: Liwen Tan, Eden Prairie, MN (US); Jae-Young Yi, Prior Lake, MN (US); Eric W. Singleton, Maple Plain, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 197 days.

(21) Appl. No.: 16/369,684

(22) Filed: Mar. 29, 2019

(51) Int. Cl.
  *H01F 10/32* (2006.01)
  *G11B 5/39* (2006.01)
  *G01D 5/16* (2006.01)

(52) U.S. Cl.
  CPC .............. *H01F 10/325* (2013.01); *G01D 5/16* (2013.01); *G11B 5/3903* (2013.01); *H01F 10/3272* (2013.01)

(58) Field of Classification Search
  CPC ...... H01F 10/3272; G01D 5/16; G11B 5/3903
  See application file for complete search history.

(56) References Cited

U.S. PATENT DOCUMENTS

| | | | |
|---|---|---|---|
| 6,452,385 B1 | 9/2002 | Shimazawa et al. |
| 7,038,890 B2 | 5/2006 | Pinarbasi |
| 7,064,934 B2 | 6/2006 | Mao et al. |
| 7,241,632 B2 | 7/2007 | Yang |
| 7,544,983 B2 | 6/2009 | Yang |
| 7,770,284 B2 | 8/2010 | Ohta et al. |
| 7,773,341 B2 | 8/2010 | Zhang et al. |
| 7,800,868 B2 | 9/2010 | Gao et al. |
| 7,848,059 B2 | 12/2010 | Yoshikawa et al. |
| 7,911,744 B2 | 3/2011 | Machita et al. |
| 7,978,439 B2 | 7/2011 | Zhang et al. |
| 8,091,209 B1 | 1/2012 | Gao et al. |
| 8,164,862 B2 | 4/2012 | Zhang et al. |
| 8,238,063 B2 | 8/2012 | Qiu et al. |
| 8,339,754 B2 | 12/2012 | Zhang et al. |
| 8,823,118 B2 | 9/2014 | Horng et al. |
| 9,121,886 B2 | 9/2015 | Singleton et al. |
| 9,442,171 B2 | 9/2016 | Singleton et al. |
| 9,646,635 B2 | 5/2017 | Singleton et al. |

(Continued)

FOREIGN PATENT DOCUMENTS

| | | |
|---|---|---|
| JP | 2000-228003 A | 8/2000 |
| JP | 2005-4942 A | 1/2005 |

(Continued)

OTHER PUBLICATIONS

Freitas, S. Cardoso et al., "Magnetic tunnel junction sensors with pTesla sensitivity", Microsyst Technol, DOI 10.1007/s00542-013-2035-1, ©Springer-Verlag Berlin Heidelberg 2013, Received: Aug. 2, 2013 / Accepted: Dec. 7, 2013, 11 pages.

*Primary Examiner* — Alvaro E Fortich
(74) *Attorney, Agent, or Firm* — Westman, Champlin & Koehler, P.A.

(57) ABSTRACT

A magnetoresistive sensor includes a free layer and a cap over the free layer. The cap includes an upper layer and an insertion layer between the upper layer and the free layer. The insertion layer includes a non-magnetic alloy formed of at least one refractory metal and at least one ferromagnetic metal.

20 Claims, 7 Drawing Sheets

(56) References Cited

U.S. PATENT DOCUMENTS

| | | |
|---|---|---|
| 10,054,649 B2 | 8/2018 | Singleton et al. |
| 10,090,008 B2 | 10/2018 | Ge et al. |
| 10,141,498 B2 | 11/2018 | Whig et al. |
| 2002/0024778 A1 | 2/2002 | Xue et al. |
| 2004/0252414 A1 | 12/2004 | Mao et al. |
| 2005/0259365 A1* | 11/2005 | Singleton ................ G11B 5/39 360/324.1 |
| 2006/0234445 A1 | 10/2006 | Yang |
| 2007/0252186 A1 | 11/2007 | Yang |
| 2007/0279801 A1 | 12/2007 | Ohta et al. |
| 2008/0299679 A1* | 12/2008 | Zhao .................... G11B 5/3909 438/3 |
| 2008/0316657 A1* | 12/2008 | Zhang ................ G01R 33/093 360/324.11 |
| 2009/0002897 A1 | 1/2009 | MacHita et al. |
| 2009/0251829 A1* | 10/2009 | Zhang ................ G11B 5/3912 360/319 |
| 2013/0341743 A1 | 12/2013 | Singleton et al. |
| 2014/0104724 A1 | 4/2014 | Shiroishi et al. |
| 2015/0221326 A1 | 8/2015 | Jung et al. |
| 2015/0311430 A1* | 10/2015 | Singleton ............. G11B 5/3906 257/421 |
| 2015/0325260 A1 | 11/2015 | Singleton et al. |

FOREIGN PATENT DOCUMENTS

| | | |
|---|---|---|
| JP | 2006-295198 A | 10/2006 |
| JP | 2007-324397 A | 12/2007 |
| JP | 4471020 B2 | 6/2010 |
| KR | 10-2014-0000659 A | 1/2014 |

\* cited by examiner

STACK CAP WITH A NON-MAGNETIC LAYER INCLUDING FERROMAGNETIC ELEMENTS

SUMMARY

In one embodiment, a magnetoresistive sensor is provided. The magnetoresistive sensor includes a free layer and a cap over the free layer. The cap includes an upper layer and an insertion layer between the upper layer and the free layer. The insertion layer includes a non-magnetic alloy formed of at least one refractory metal and at least one ferromagnetic metal.

In another embodiment, a method is provided. The method includes forming a free layer, and forming a cap over the free layer. The cap includes an upper layer and an insertion layer between the upper layer and the free layer. The insertion layer includes a non-magnetic alloy formed of at least one refractory metal and at least one ferromagnetic metal.

In yet another embodiment, a magnetoresistive sensor is provided. The magnetoresistive sensor includes a free layer and a cap over the free layer. The cap includes a non-magnetic alloy formed of at least one refractory metal and at least one ferromagnetic metal.

Other features and benefits that characterize embodiments of the disclosure will be apparent upon reading the following detailed description and review of the associated drawings.

DETAILED DESCRIPTION OF ILLUSTRATIVE EMBODIMENTS

Noble metals such as iridium (Ir), ruthenium (Ru) and platinum (Pt) are commonly used for a stack cap to protect a stack free layer from damage during read sensor fabrication. However, Ir, Ru and Pt have a strong tendency to from alloys with cobalt (Co), iron (Fe) and nickel (Ni) at a wide range of ratio. Thus, when these cap materials are used as stack caps, alloy phases may be formed at an interface due to intermixing between the free layer and stack cap materials. This may impact free layer magnetics, such as magnetic moment, coercivity, magnetostriction, etc., which may degrade read sensor performance.

To address the above problems, embodiments disclosure provide a non-magnetic insertion layer between the reader stack free layer and the noble metal (e.g., Ir, Ru, Pt) cap layer to improve free layer magnetic properties, while preserving advantages of the noble metal to protect the reader from damage during fabrication. Prior to providing additional details regarding the different embodiments, a description of an illustrative operating environment is provided below.

Figure 1:
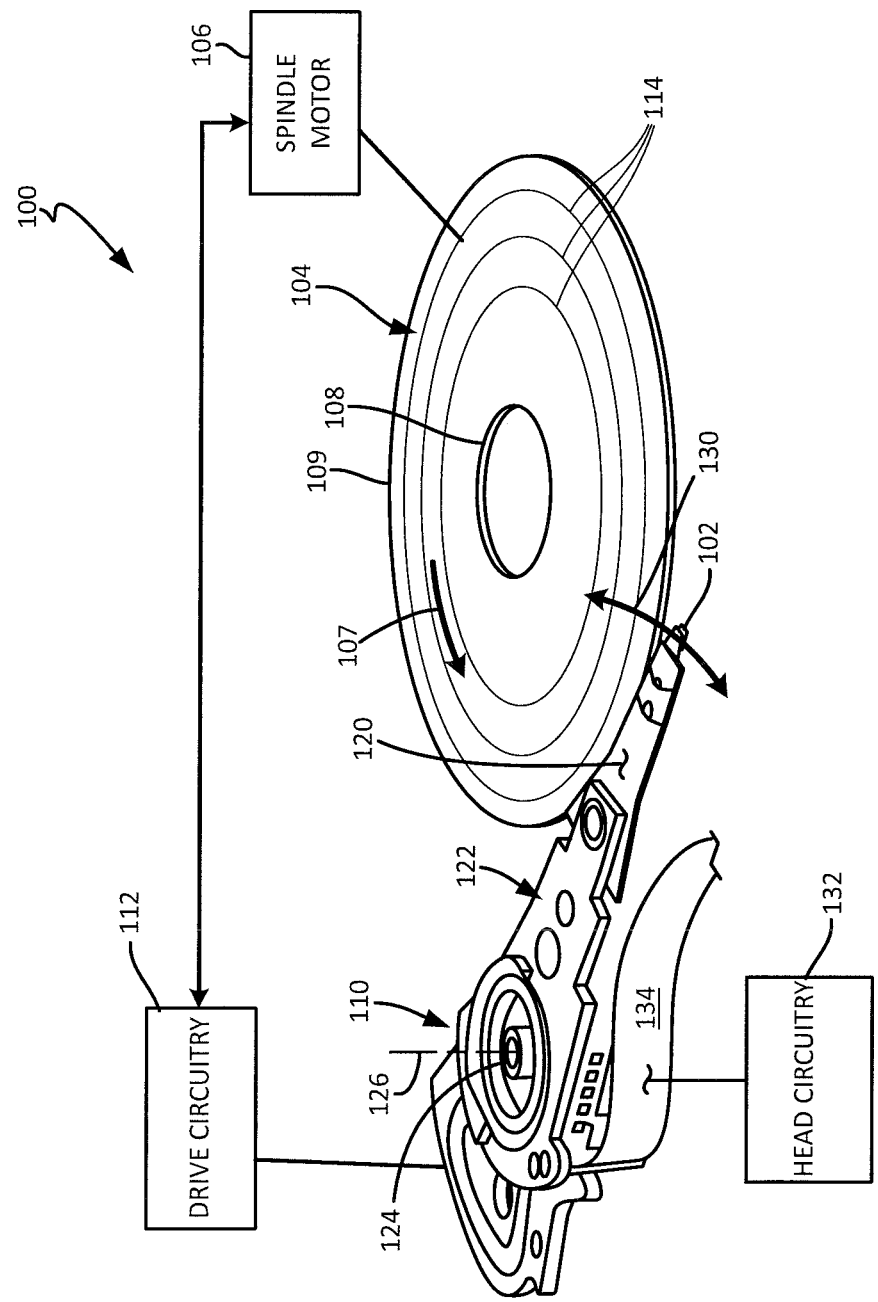
FIG. 1 is a schematic illustration of a data storage system including a data storage medium and a head for reading data from and/or writing data to the data storage medium.

FIG. 1 shows an illustrative operating environment in which at least some of embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments.

It should be noted that like reference numerals are used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

FIG. 1 is a schematic illustration of a data storage device 100 including a data storage medium and a head for reading data from and/or writing data to the data storage medium. In data storage device 100, head 102 is positioned above storage medium 104 to read data from and/or write data to the data storage medium 104. In the embodiment shown, the data storage medium 104 is a rotatable disc or other magnetic storage medium that includes a magnetic storage layer or layers. For read and write operations, a spindle motor 106 (illustrated schematically) rotates the medium 104 as illustrated by arrow 107 and an actuator mechanism 110 positions the head 102 relative to data tracks 114 on the rotating medium 104 between an inner diameter 108 and an outer diameter 109. Both the spindle motor 106 and actuator mechanism 110 are connected to and operated through drive circuitry 112 (schematically shown). The head 102 is coupled to the actuator mechanism 110 through a suspension assembly which includes a load beam 120 connected to an actuator arm 122 of the mechanism 110 for example through a swage connection. Although FIG. 1 illustrates a single load beam coupled to the actuator mechanism 110, additional load beams 120 and heads 102 can be coupled to the actuator mechanism 110 to read data from or write data to multiple discs of a disc stack. The actuator mechanism 110 is rotationally coupled to a frame or deck (not shown) through a bearing 124 to rotate about axis 126. Rotation of the actuator mechanism 110 moves the head 102 in a cross track direction as illustrated by arrow 130.

The head 102 includes one or more transducer elements (not shown in FIG. 1) coupled to head circuitry 132 through flex circuit 134. Details regarding elements of a head such as 102 are provided below in connection with FIG. 2.

Figure 2:
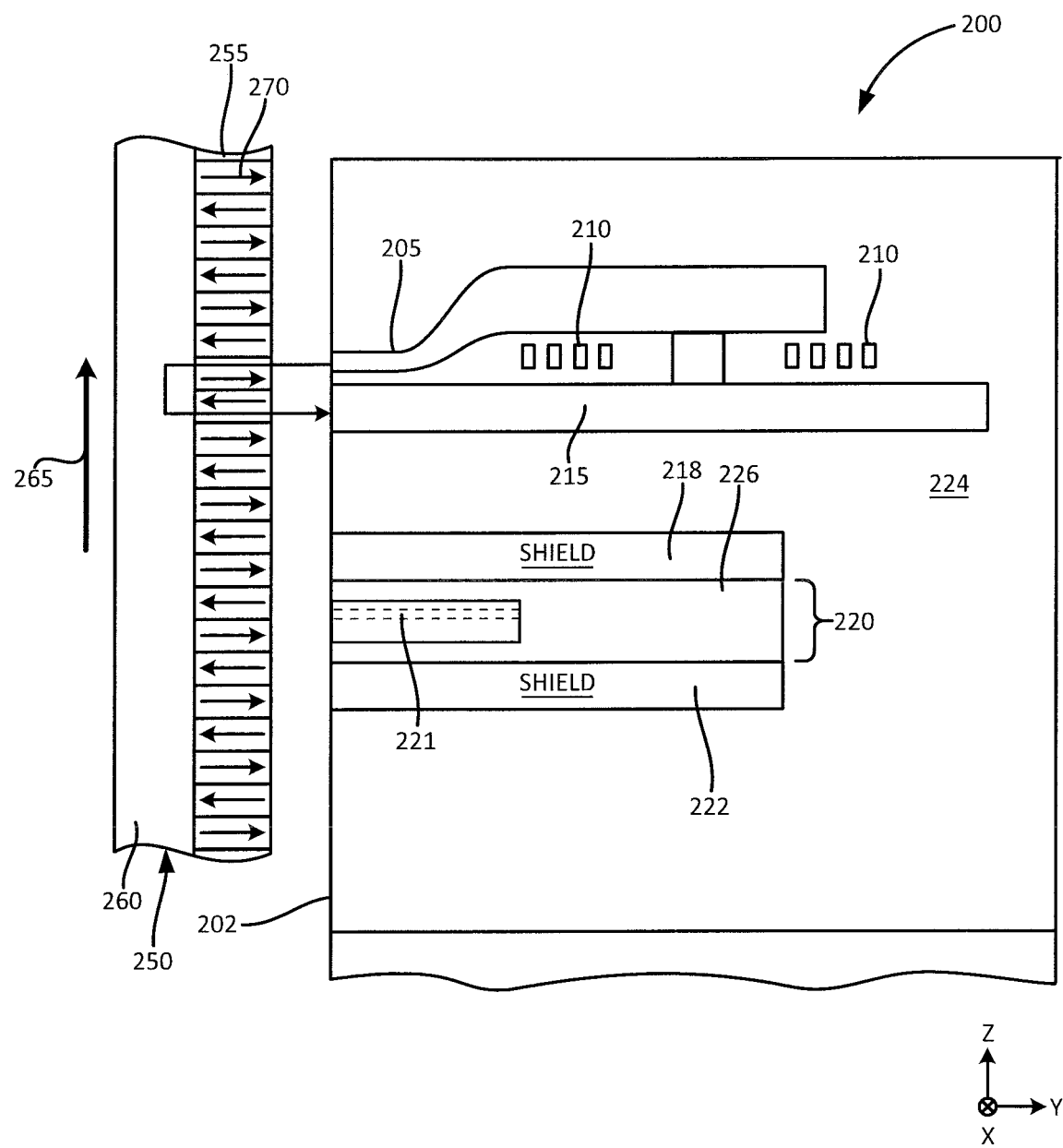
FIG. 2 is a schematic diagram of a cross-section of one embodiment of a recording head that reads from and writes to a storage medium.

FIG. 2 is a schematic diagram showing a cross-sectional view of portions of a recording head 200 and a data storage medium 250 taken along a plane substantially normal to a plane of a bearing surface (for example, an air bearing surface (ABS)) 202 of recording head 200. The recording head elements shown in FIG. 2 are illustratively included in a recording head such as recording head 102 in FIG. 1. Medium 250 is illustratively a data storage medium such as medium 104 in FIG. 1. Those skilled in the art will recognize that recording heads and recording media commonly include other components. Embodiments of the present disclosure are not limited to any particular recording heads or media. Embodiments of the present disclosure may be practiced in different types of recording heads and media.

Recording head 200 includes a write pole 205, a magnetization coil 210, a return pole 215, a top shield 218, a read transducer 220, a bottom shield 222 and a wafer overcoat 224. Storage medium 250 includes a recording layer 255 and an underlayer 260. Storage medium 250 rotates in the direction shown by arrow 265. Arrow 265 is illustratively a direction of rotation such as arrow 107 in FIG. 1.

In an embodiment, electric current is passed through coil 210 to generate a magnetic field. The magnetic field passes from write pole 205, through recording layer 255, into underlayer 260, and across to return pole 215. The magnetic field illustratively records a magnetization pattern 270 in recording layer 255. Read transducer 220 senses or detects magnetization patterns in recording layer 255, and is used in retrieving information previously recorded to layer 255.

As will be described in detail further below, read transducer 220 has multiple layers including a sensing layer or free layer. The layers of the read transducer 220 may be stacked along a track direction (e.g., a z-direction in FIG. 2) or a track width direction that is perpendicular to the track direction (e.g., a cross-track direction, which is an x-direction in FIG. 2). A y-direction in FIG. 2 is then defined as a direction that is perpendicular to x and z simultaneously, which is a stripe-height direction. As noted above, embodiments of the disclosure provide a non-magnetic insertion layer between the sensing layer or free layer and a noble metal (e.g., Ir, Ru, Pt) upper cap layer to improve free layer magnetic properties. The non-magnetic insertion layer is denoted by reference numeral 221 in FIG. 2. Details regarding the non-magnetic insertion layer and other layers of the stack are provided below in connection with FIG. 3A.

Figure 3A:
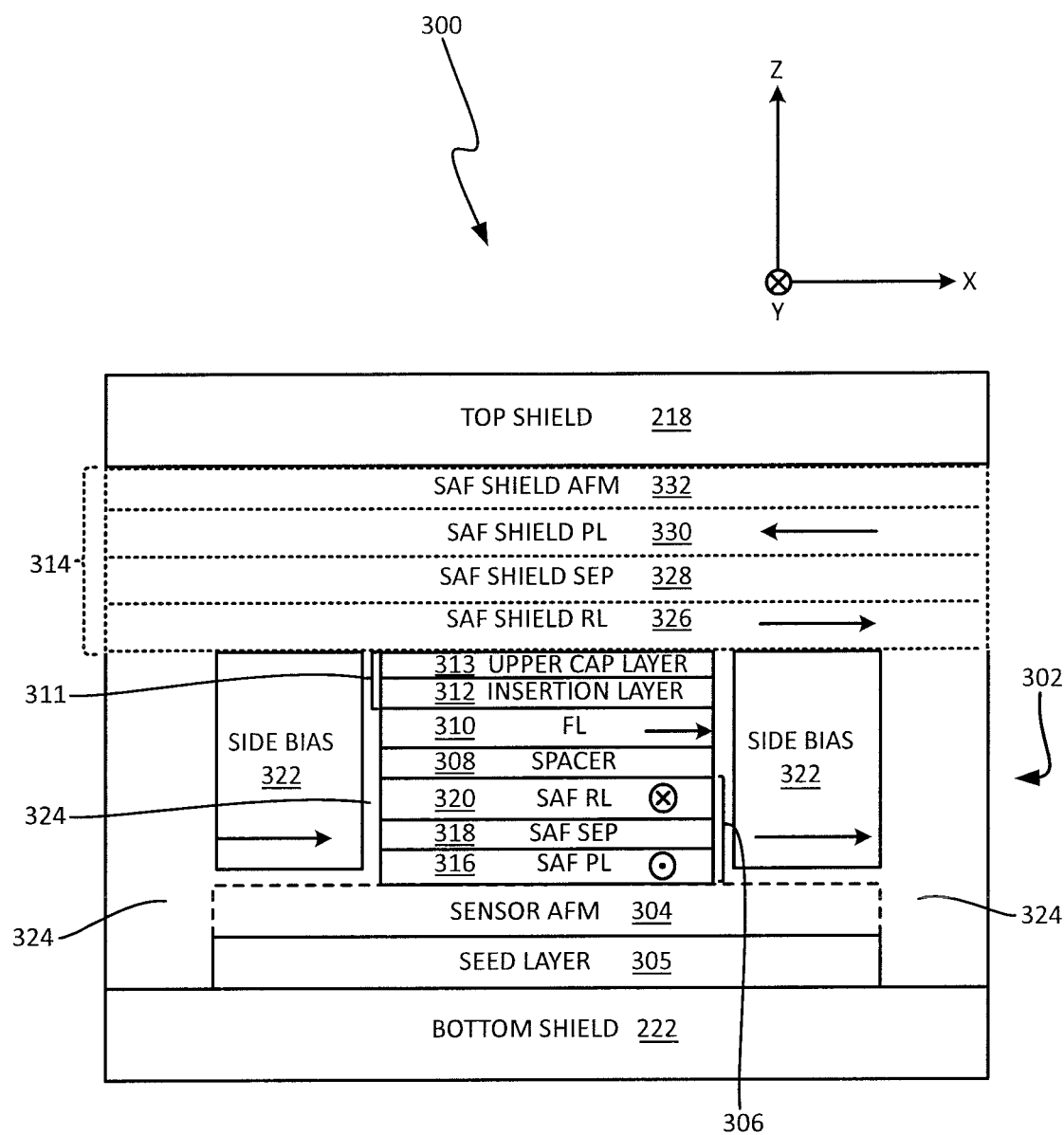
FIG. 3A is a bearing surface view of a read head in accordance with one embodiment.

FIG. 3A is a schematic block diagram showing a bearing surface view of a read head 300 including a non-magnetic insertion layer including ferromagnetic elements in accordance with one embodiment. Read head 300 includes a magnetoresistive sensor 302 that is positioned between top shield 218 and bottom shield 222. Top and bottom shields 218 and 222, which may include a material having high magnetic permeability, reduce or substantially block extraneous magnetic fields, such as, for example, those from adjacent bits on data discs from impacting the magnetoresistive sensor 302, thus improving the performance of the magnetoresistive sensor 302. In one implementation, the top and bottom shields 218 and 222 permit magnetic fields from the bit directly under magnetoresistive sensor 302 to affect the magnetoresistive sensor 302, and thus be read.

The magnetoresistive sensor 302 includes a plurality of layers including a sensor stack synthetic antiferromagnetic (SAF) structure 306, a spacer layer 308, a free layer or sensing layer 310, and a stack cap 311, which includes an insertion layer 312 and an upper cap layer 313. A sensor antiferromagnetic (AFM) layer 304 may optionally be included in some embodiments. A seed layer 305 may be included between the bottom shield 222 and the AFM layer 304, or between the bottom shield 222 and the sensor SAF structure 306 in embodiments in which the AFM layer 304 is absent. Also, an SAF shielding structure 314 may optionally be included above the stack cap 311. Thus, top shield 218 may include a single pinned layer 218 or may include multi-layered SAF structure 314. Dashed lines are used to represent elements within structure 314 to indicate that structure 314 is optional. Also, dashed lines are used to indicate that AFM layer 304 is optional.

In the embodiment shown in FIG. 3A, the sensor SAF structure 306 includes a pinned layer 316 a thin separation layer 318, which may comprise a metal such as ruthenium (Ru) in some embodiments, and a reference layer 320. The magnetic moments of each of the pinned layer 316 and the reference layer 320 are not allowed to rotate under magnetic fields in the range of interest (for example, magnetic fields generated by the bits of data stored on the data discs). The magnetic moments of the reference layer 320 and the pinned layer 316 are generally oriented normal to the plane (e.g., the y direction) of FIG. 3A and anti-parallel to each other.

The magnetic moment of the free layer 310 is free to rotate under the influence of an applied magnetic field in a range of interest. The read head 300 further includes side shields 322, which reduce or substantially block extraneous magnetic fields, such as, for example, those from bits on adjacent tracks from impacting the magnetoresistive sensor 302. Further, side shields 322 may produce a magnetic field that biases the free layer 310 with a magnetic moment parallel to the plane of the figure and generally oriented horizontally. The bias is sufficiently small, however, that the magnetic moment of the free layer 310 can change in response to an applied magnetic field, such as a magnetic field of a data bit stored on the data discs. In some embodiments, the side shields 322 are formed of soft magnetic material (e.g., material that can be easily magnetized and demagnetized at relatively low magnetic fields). The soft magnetic material may be an alloy comprising Ni and Fe. The magnetoresistive sensor 302 is separated and electrically isolated from the side shields 322 by an isolation layer 324 including, for example, insulating materials. Isolation layer 324 may also be present in other regions of head 300 as shown in FIG. 3A.

In the embodiment shown in FIG. 3A, optional SAF shielding structure 314 includes a SAF shield reference layer 326, a thin SAF shield separation layer 328, which may comprise a metal such as Ru in some embodiments, a SAF shield pinned layer 330 and a SAF shield AFM layer 332. In some embodiments, SAF shield reference layer 326 may have a relatively fixed magnetization to assist in stabilizing the magnetizations of side shields 322. Thus, AFM layer 332 pins the magnetization of layer SAF shield pinned layer 330 substantially parallel to the bearing surface, which results in the relatively fixed magnetization of SAF shield reference layer 326 due to antiferromagnetic coupling across SAF shield separation layer 328 and thus in stabilizing the magnetizations of the side shields 322 substantially parallel to the bearing surface as well. SAF shield reference layer 326 and SAF shield pinned layer 330 may be formed of a soft magnetic material (for example, an alloy comprising Ni and Fe).

In some embodiments, sensor 302 may utilize tunnel magnetoresistance (TMR) or giant magnetoresistance (GMR) effects. In embodiments that utilize TMR effects, spacer layer 308 is a tunneling barrier layer that separates the SAF structure 306 from the free layer 310. The tunneling barrier layer 308 is sufficiently thin that quantum mechanical electron tunneling occurs between a reference layer 320 in the SAF structure 306 and the free layer 310. The electron tunneling is electron-spin dependent, making the magnetic response of the magnetoresistive sensor 302 a function of the relative orientations and spin polarizations of the SAF structure 306 and the free layer 310. The highest probability of electron tunneling occurs when the magnetic moments of the SAF structure 306 and the free layer 310 are parallel, and the lowest probability of electron tunneling occurs when the magnetic moments of the SAF structure 306 and the free layer 310 are antiparallel. Accordingly, the electrical resistance of the magnetoresistive sensor 302 changes in response to an applied magnetic field. The data bits on the data discs in the disc drive may be magnetized in a direction normal to the plane of FIG. 3A, either into the plane of the figure, or out of the plane of the figure. Thus, when the magnetoresistive sensor 302 passes over a data bit, the magnetic moment of the free layer 310 is rotated either into the plane of FIG. 3A or out of the plane of FIG. 3A, changing the electrical resistance of the magnetoresistive sensor 302. The value of the bit being sensed by the magnetoresistive sensor 302 (for example, either 1 or 0) may therefore be determined based on the current flowing from a first electrode (not shown) to a second electrode (not shown) connected to the magnetoresistive sensor 302.

As noted above, a stack cap is used to protect the free layer from damage during sensor 302 fabrication. As indicated earlier, noble metals such as Ir, Ru and Pt are commonly used for a stack cap. However, Ir, Ru and Pt have a strong tendency to from alloys with Co, Fe and Ni at a wide range of ratio. Thus, when these cap materials are used as stack caps, alloy phases may be formed at an interface due to intermixing between the FL and stack cap materials. This may impact free layer magnetics, such as magnetic moment, coercivity, magnetostriction, etc., which would degrade read sensor performance.

To address the above problem, read sensor 300 employs bi-layered cap 313, which includes upper cap layer 313 and insertion layer 312, which is between free layer 310 and upper cap layer 313. Insertion layer 313 is a non-magnetic alloy layer and is included between free layer 310 and noble metal (e.g., Ir) upper cap layer 313 to improve free layer 310 magnetic properties, while preserving advantages of the noble metal to protect the reader from damage during reader fabrication. The non-magnetic alloy employed to form insertion layer 312 includes at least one refractory metal (e.g., Ta, Zr, Hf, Nb, etc.) and at least one ferromagnetic metal (e.g., Co, Fe, Ni, etc., which may also be included in reader free layer 310). In one embodiment, insertion layer 312 is formed of CoFeTa. Here, the desired composition of Ta in CoFeTa is between about 30 atomic percent (at %) and about 40 at %, which ensures that CoFeTa is non-magnetic and amorphous. (CoFe10)Ta$_x$, for example, is magnetic when x<25 at %. The composition of refractory metals may vary from different ferromagnetic metals that may be utilized in the insertion layer 312 alloy, but the goal is for the insertion layer 312 to be non-magnetic and amorphous. Since ferromagnetic elements are a majority of the elements in the insertion layer 312, the interface between free layer 310 and insertion layer 312 is more homogenous compared to, for example, an interface between a free layer and an Ir cap. The free layer 310 magnetics are better-preserved by employing insertion layer 312. Further, the amorphous insertion layer 312 can help reduce Ir diffusion into free layer 310 compared to other crystalline metals. Amorphous insertion layer 312 is beneficial in reducing overall stack cap stress and its impact on the crystal structure of the stack free layer 310. In some embodiments of the disclosure, to prevent or substantially reduce diffusion of the upper cap layer 313 material into the free layer 310, a thickness of the insertion layer 312 may between about 0.5 nanometers (nm) and about 3 nm. In certain embodiments, a thickness of the upper cap layer may be greater than 3 nm. It should be noted that, in some embodiments, the ferromagnetic elements in the insertion layer 312 are the same as the ferromagnetic elements in the free layer 310. In other embodiments, ferromagnetic elements in the insertion layer 312 may be different from the ferromagnetic elements in the free layer 310.

Figure 3B:
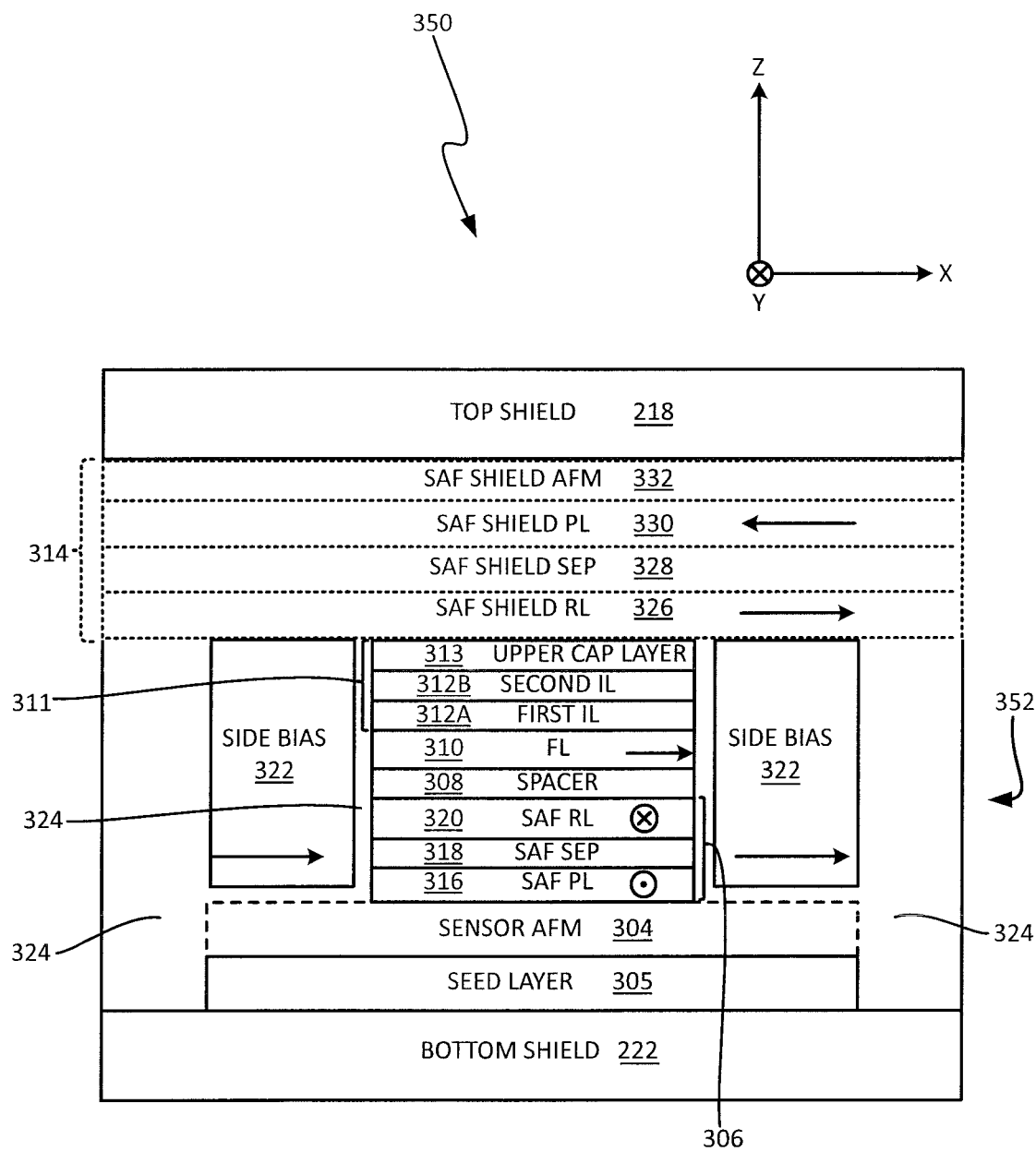
FIG. 3B is a bearing surface view of a read head in accordance with another embodiment.

In the embodiment described above in connection with FIG. 3A, the insertional layer 312 is a monolayer. However, in an alternate embodiment, the insertion layer may be a bi-layer or a multi-layer. Such an embodiment is shown in FIG. 3B. Recording head 350 of FIG. 3B includes a magnetoresistive sensor 352 that includes an insertion layer having a first sublayer 312A and a second sublayer 312B. Both the first and second sublayers 312A and 312B are formed of alloys having at least one refractory metal and at least one ferromagnetic metal. However, at least one element of the second sublayer 312B is different from the elements of the first sublayer 312A. In other respects, recording head 350 is substantially similar to recording head 300 of FIG. 3A. Therefore, a description of the similar elements is not repeated.

Figure 3C:
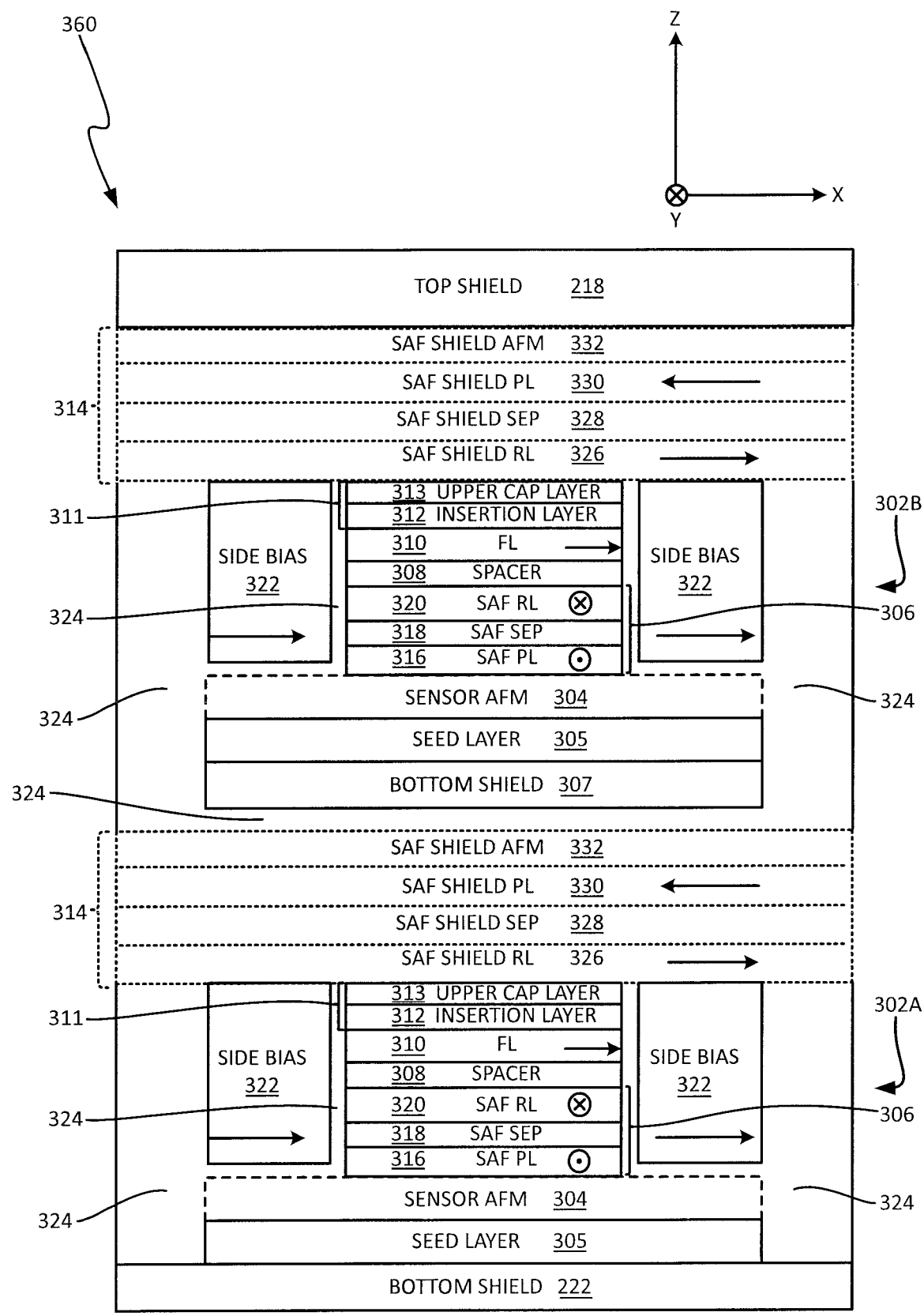
FIG. 3C is a multi-sensor read head in accordance with one embodiment.

FIG. 3C is a schematic block diagram illustrating an example read head 360 including multiple magnetoresistive sensors (for example, 302A and 302B) stacked along a track direction (e.g., the z-direction in FIG. 3C). In some embodiments, sensors 302A and 302B in read head 360 may be isolated from each other by isolation layer 324, which is present in a region between sensors 302A and 302B in FIG. 3C. Each of sensors 302A and 302B is generally similar to sensor 302 of FIG. 3A and therefore a description of individual sensors 302A and 302B is not provided in connection with FIG. 3C. A bottom shield of upper sensor 302B is denoted by reference numeral 307. In the embodiment of FIG. 3C, both sensors 302A and 302B are shown as including a cap 311, which is a bi-layer. However, in some embodiments, one sensor (e.g., 302A) may include a bi-layer 311 and another sensor (e.g., 302B) may include a monolayer (e.g., upper cap layer 313) without insertion layer 312. In general, in a multi-sensor read head such as 360, one or more sensors may include a bi-layer such as 311 and other sensors may include a monolayer such as 313 without insertion layer 312.

Figure 3D:
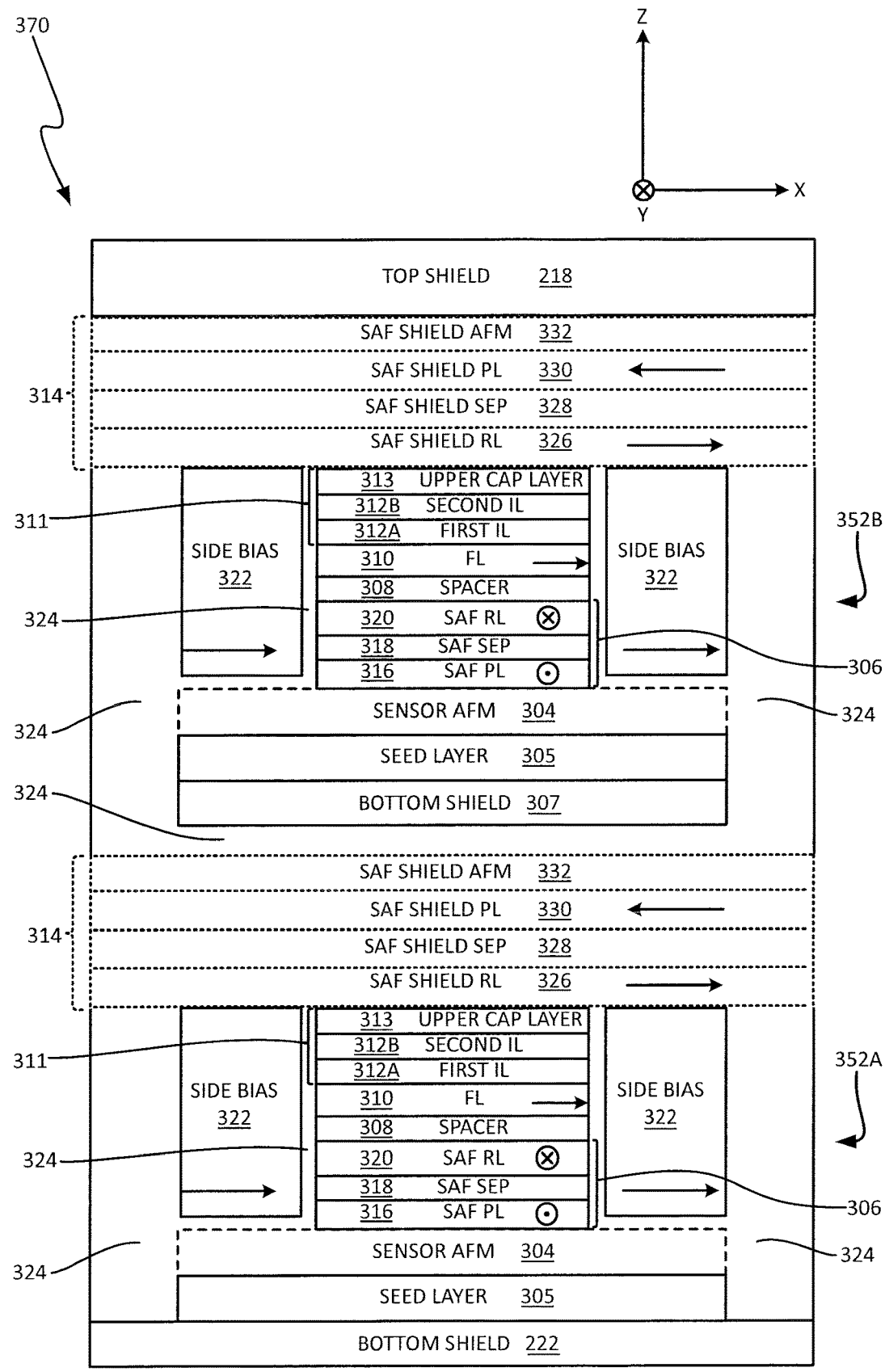
FIG. 3D is a multi-sensor read head in accordance with another embodiment.

FIG. 3D is a schematic block diagram illustrating an example read head 370 including multiple magnetoresistive sensors (for example, 352A and 352B) stacked along a track direction (i.e., the z-direction in FIG. 3D). In some embodiments, sensors 352A and 352B in sensor 370 may be isolated from each other by isolation layer 324, which is present in a region between sensors 352A and 352B in FIG. 3D. Each of sensors 352A and 352B is generally similar to sensor 352 of FIG. 3B and therefore a description of individual sensors 352A and 352B is not provided in connection with FIG. 3D. In the embodiment of FIG. 3D, both sensors 352A and 352B are shown as including a multi-layered cap 311, with the insertion layer being a bi-layer including layers 312A and 312B. However, in an alternate embodiment, one sensor (e.g., 352A) may include an upper cap layer 313 and insertion layers 312A and 312B and another sensor (e.g., 352B) may include a monolayer (e.g., upper cap layer 313) without insertion layers 312A and 312B or a bi-layer including upper cap layer 313 and one insertion layer 312A or 312B. In general, in a multi-sensor read head such as 370, one or more sensors may include upper cap layer 313 and insertion layers 312A and 312B and other sensors may include a monolayer such as 313 without insertion layer 312 or a bi-layer including upper cap layer 313 and one insertion layer 312A or 312B.

Figure 4:
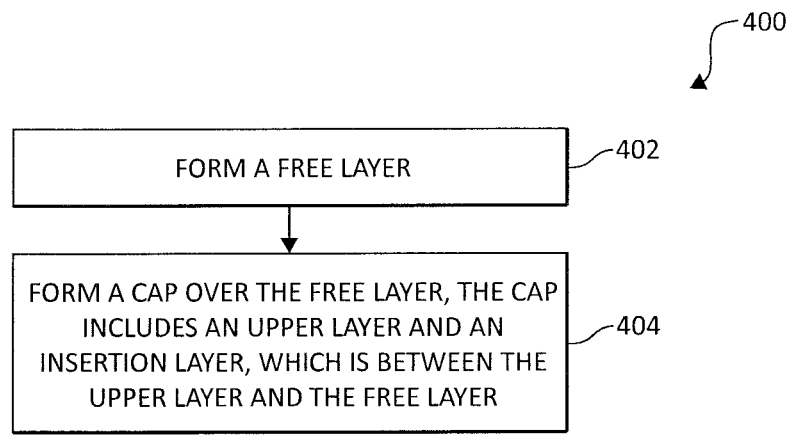
FIG. 4 is a flow diagram of a method embodiment.

FIG. 4 is a flow diagram of a method embodiment. The method includes forming a free layer at 402. At 404, a cap is formed over the free layer. The cap includes an upper layer and an insertion layer between the upper layer and the free layer. The insertion layer includes a non-magnetic alloy formed of at least one refractory metal and at least one ferromagnetic metal.

Table 1 below shows a comparison of values of magnetic properties of a recording head with a baseline cap (e.g., a monolayer formed of a noble metal) and a recording head of the type shown in FIG. 3A with a bi-layered cap having an upper cap layer formed of a noble metal and a non-magnetic insertion layer formed of at least refractory metal and at least one ferromagnetic metal.

TABLE 1

| Stack Cap | Normalized magnetization | Easy axis coercivity | Hard axis coercivity | Normalized magnetostriction |
|---|---|---|---|---|
| Baseline cap | 1 | 9 | 2 | 1 |
| Cap with non-magnetic insertion layer | 1.07 | 5 | 0.5 | 0.85 |

Figure 5:
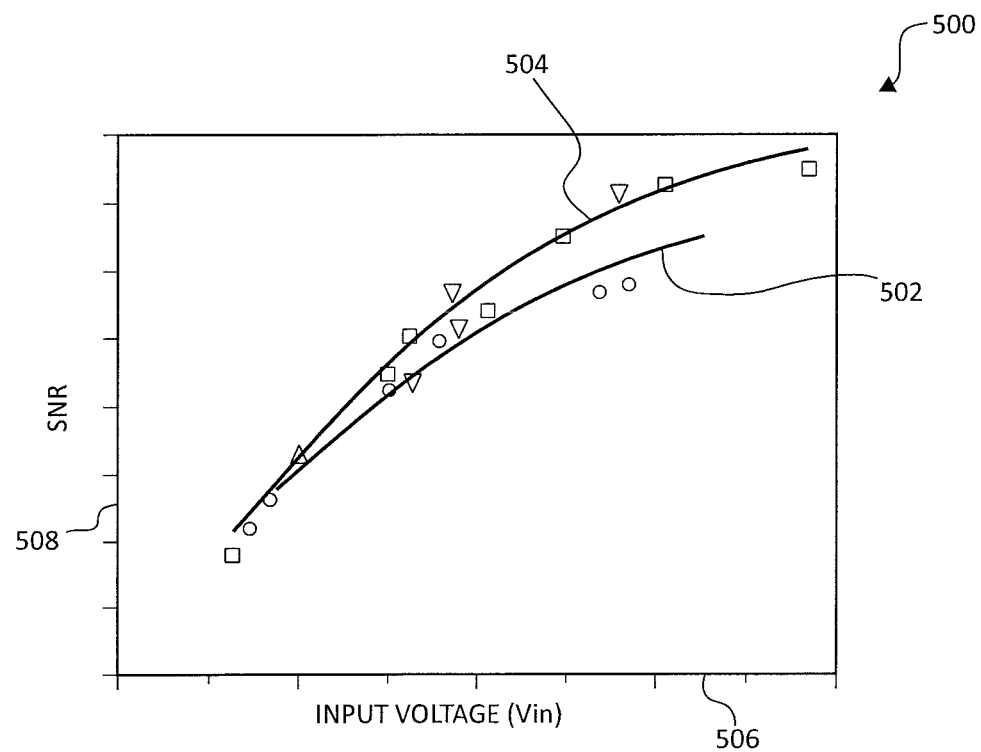
FIG. 5 is a graph comparing results obtained from a baseline reader with results obtained from a reader of the type shown in FIG. 3A.

As can be seen in Table 1, with the non-magnetic insertion layer, flux of the free layer increases 7%, magnetostriction decreases 15% and coercivity decreases about 36% and 75% for easy and hard axis, respectively, which transfers to reader sensor performance improvement, as shown in FIG. 5.

FIG. 5 is a graph 500 that illustrates a comparison of results obtained for a recording head with a baseline cap without an insertion layer (plot 502) and results for a recording head having a cap with an insertion layer (plot 504). In FIG. 5, horizontal axis 506 represents input voltage to the recording heads and vertical axis 508 represents signal-to-noise ratio (SNR). FIG. 5 indicates a 0.5 dB SNR improvement for the recording head having a cap with an insertion layer compared to the recording head with the baseline cap design. The SNR gain comes from intrinsic noise reduction for the recording head with the insertion layer.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments employ more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A magnetoresistive sensor comprising:
a free layer having a top surface;
a cap layer over the free layer, the cap layer comprising:
an upper layer having a top surface and a bottom surface; and
an insertion layer between the upper layer and the free layer, the insertion layer having a top surface that is in direct contact with the bottom surface of the upper layer and a bottom surface that is in direct contact with the top surface of the free layer, the insertion layer comprising a non-magnetic alloy formed of at least one refractory metal and at least one ferromagnetic metal, and wherein the insertion layer is configured to prevent or mitigate diffusion of a material of the upper layer into the free layer; and
a shield layer above the upper layer of the cap layer, the shield layer having a bottom surface that is in direct contact with the top surface of the upper layer of the cap layer.

2. The magnetoresistive sensor of claim 1 and wherein the upper layer comprises at least one noble metal.

3. The magnetoresistive sensor of claim 2 and wherein the at least one noble metal comprises at least one of iridium (Ir), ruthenium (Ru) or platinum (Pt).

4. The magnetoresistive sensor of claim 1 and wherein the at least one refractory metal comprises at least one of tantalum (Ta), zirconium (Zr), hafnium (Hf) or niobium (Nb).

5. The magnetoresistive sensor of claim 1 and wherein the at least one ferromagnetic metal comprises cobalt (Co), iron (Fe), nickel (Ni) or combinations thereof.

6. The magnetoresistive sensor of claim 1 and wherein a thickness of the insertion layer is between 0.5 nanometers (nm) and 3 nm.

7. The magnetoresistive sensor of claim 1 and wherein the insertion layer comprises a CoFeTa alloy with a composition of Ta being between 30 atomic percent (at %) and 40 at %.

8. The magnetoresistive sensor of claim 1 and wherein the insertion layer is amorphous.

9. A method of forming a magnetoresistive sensor, the method comprising:
  forming a free layer having a top surface;
  forming a cap layer over the free layer, the cap layer comprising:
    an upper layer having a top surface and a bottom surface; and
    an insertion layer between the upper layer and the free layer, the insertion layer having a top surface that is in direct contact with the bottom surface of the upper layer and a bottom surface that is in direct contact with the top surface of the free layer, the insertion layer comprising a non-magnetic alloy formed of at least one refractory metal and at least one ferromagnetic metal, and wherein the insertion layer is configured to prevent or mitigate diffusion of a material of the upper layer into the free layer; and
  forming a shield layer over the upper layer of the cap layer, the shield layer having a bottom surface that is in direct contact with the top surface of the upper layer of the cap layer.

10. The method of claim 9 and wherein the upper layer comprises at least one noble metal.

11. The method of claim 10 and wherein the at least one noble metal comprises at least one of iridium (Ir), ruthenium (Ru) or platinum (Pt).

12. The method of claim 9 and wherein the at least one refractory metal comprises at least one of tantalum (Ta), zirconium (Zr), hafnium (Hf) or niobium (Nb).

13. The method of claim 9 and wherein the at least one ferromagnetic metal comprises cobalt (Co), iron (Fe), nickel (Ni) or combinations thereof.

14. The method of claim 9 and wherein a thickness of the insertion layer is between 0.5 nanometers (nm) and 3 nm.

15. The method of claim 9 and wherein the insertion layer comprises a CoFeTa alloy with a composition of Ta being between 30 atomic percent (at %) and 40 at %.

16. The method of claim 9 and wherein the insertion layer is amorphous.

17. A magnetoresistive sensor comprising:
  a free layer having a top surface; and
  a cap layer over the free layer, the cap layer comprising:
    an upper layer having a top surface and a bottom surface; and
    an insertion layer between the upper layer and the free layer, the insertion layer having a top surface that is in direct contact with the bottom surface of the upper layer and a bottom surface that is in direct contact with the top surface of the free layer, the insertion layer comprising a non-magnetic alloy formed of a least one refractory metal and at least one ferromagnetic metal; and
  a shield layer above the upper layer of the cap layer, the shield layer having a bottom surface that is in direct contact with the top surface of the upper layer of the cap layer.

18. The magnetoresistive sensor of claim 17 and wherein the at least one refractory metal comprises at least one of tantalum (Ta), zirconium (Zr), hafnium (Hf) or niobium (Nb).

19. The magnetoresistive sensor of claim 17 and wherein the at least one ferromagnetic metal comprises cobalt (Co), iron (Fe), nickel (Ni) or combinations thereof.

20. The magnetoresistive sensor of claim 17 and wherein the insertion layer comprises a CoFeTa alloy with a composition of Ta being between 30 atomic percent (at %) and 40 at %.

* * * * *